(12) United States Patent
Nam (10) Patent No.: US 7,310,452 B2
(45) Date of Patent: Dec. 18, 2007

(54) OFFSET ADJUSTMENT METHODS OF SIGNAL CONVERTING CIRCUITS

(75) Inventor: Jung-hyun Nam, Kyungki-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/759,256

(22) Filed: Jun. 7, 2007

(65) Prior Publication Data

US 2007/0229126 A1      Oct. 4, 2007

Related U.S. Application Data

(62) Division of application No. 10/438,165, filed on May 14, 2003, now Pat. No. 7,242,820.

(30) Foreign Application Priority Data

May 14, 2002   (KR) ............................ 2002/0026435

(51) Int. Cl.
*G06K 7/00*      (2006.01)
*G06K 9/20*      (2006.01)
(52) U.S. Cl. ..................................... 382/312; 348/294
(58) Field of Classification Search ................ 382/312; 348/294, 297
See application file for complete search history.

(56) References Cited

U.S. PATENT DOCUMENTS 5,877,715 A    3/1999  Gowda et al.
5,982,318 A   11/1999  Yiannoulos et al.
6,067,113 A    5/2000  Hurwitz et al.
6,590,610 B2   7/2003  Castro et al.
6,704,046 B2 * 3/2004  Dyas et al. .............. 348/223.1

OTHER PUBLICATIONS

Ludwig et al. "On-Focal Plane Analog-to-Digital Conversion with Detector Gain and Offset Compensation" *Proceedings of the SPIE* part 1097 pp. 73-84 (1989).
Netherlands Industrial Property Office Search Report for Netherlands application No. NL 1023152 mailed on Mar. 23, 2005.

* cited by examiner

*Primary Examiner*—Phuoc Tran
(74) *Attorney, Agent, or Firm*—Myers Bigel Sibley & Sajovec (57) ABSTRACT

An image sensor includes a photosensitive element that generates an electrical signal corresponding to light incident thereon and a ramp signal generator that generates a ramp signal. Generation of the ramp signal is initiated in response to activation of a ramp enable signal. An offset adjusting circuit generates a counter enable signal after activation of the ramp enable signal and after initiating generation of the ramp signal. A counter initiates counting responsive to generation of the counter enable signal. A latch latches a counter output responsive to a comparison of the ramp signal and the electrical signal corresponding to light incident on the photosensitive element. Related methods are also discussed.

5 Claims, 10 Drawing Sheets

OFFSET ADJUSTMENT METHODS OF SIGNAL CONVERTING CIRCUITS

RELATED APPLICATIONS

This application claims the benefit of priority as a divisional of U.S. application Ser. No. 10/438,165 filed May 14, 2003 now U.S. Pat. No. 7,242,820. This application also claims the benefit of priority from Korean Patent Application No. 2002-26435, filed May 14, 2002. The disclosures of each of the above referenced U.S. and Korean applications are hereby incorporated herein by reference in their entirety as if set forth fully herein.

FIELD OF THE INVENTION

The present invention relates to sensors, and more particularly, to image sensors and related methods.

DESCRIPTION OF THE RELATED ART

In general, CMOS image sensors include unit pixels, each having a photodiode and a MOS transistor. A CMOS image sensor sequentially detects a signal using a switching method to form an image.

Figure 1:
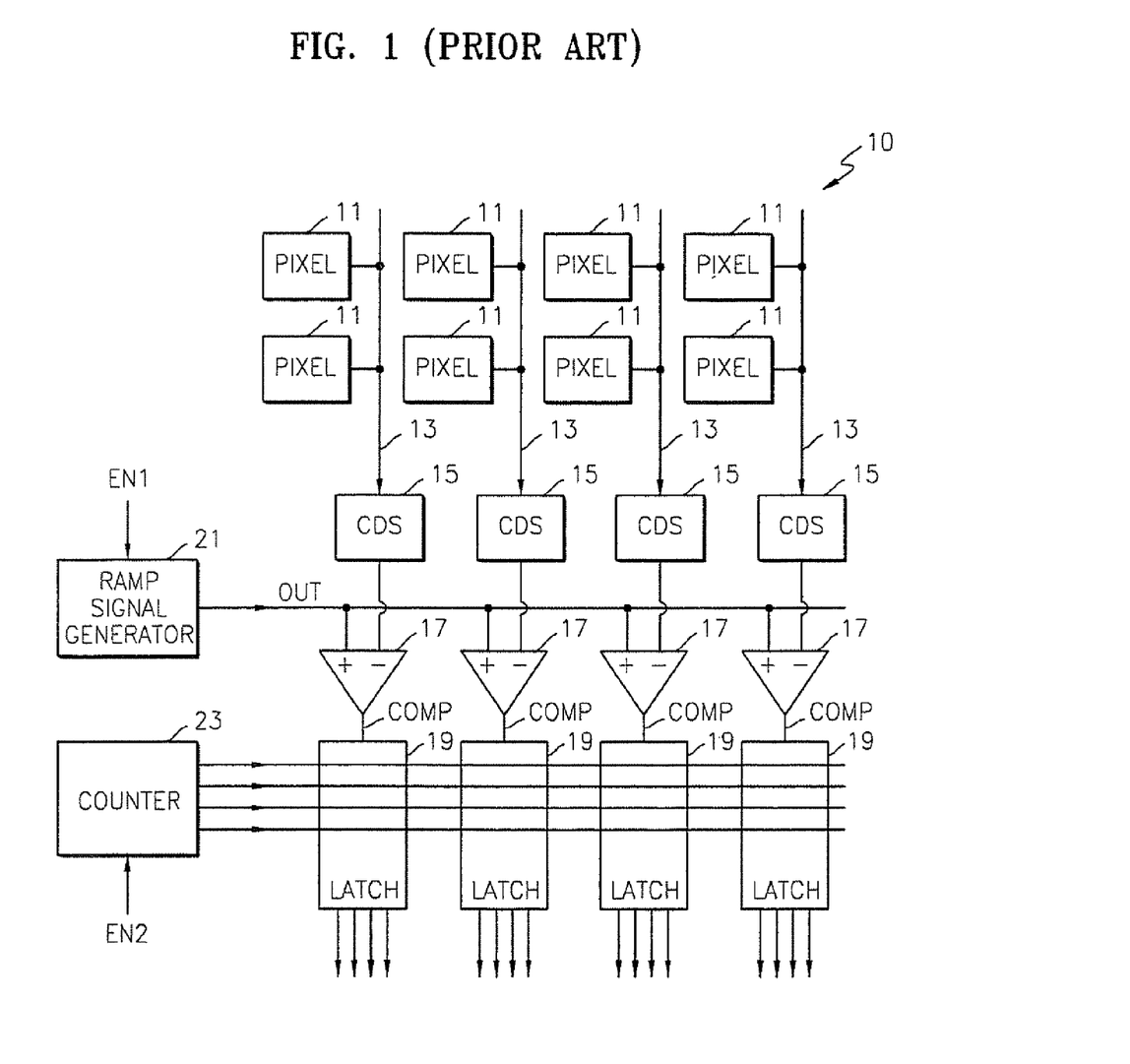
FIG. 1 is a diagram illustrating a ramp comparison analog-to-digital converter used in a prior art CMOS image sensor.

FIG. 1 illustrates a ramp comparison analog-to-digital converter used in prior art CMOS image sensors. Referring to FIG. 1, ramp comparison analog-to-digital converter includes a plurality of pixels 11, a plurality of correlated double sampling (CDS) circuits 15, a ramp signal generator 21, a plurality of comparators 17, a counter 23, and a plurality of latches 19.

As each pixel 11 generates an electrical signal (for example, an analog signal) in response to incident light, the electrical signal is input to a CDS circuit 15 through a data line 13 coupled to the pixel. Each CDS circuit 15 receives an electrical signal, performs correlated double sampling, and outputs the sampled signal to a comparator 17 corresponding to the CDS circuit 15.

The ramp signal generator 21 outputs a ramp signal (OUT) in response to a ramp enable signal (EN1). Each of the plurality of comparators 17 receives the ramp signal through the (+) terminal, and the output signal of the CDS circuit 15 through the (−) terminal. The comparators 17 compare the received signals and provide comparison signals (COMP) (corresponding to results of the comparisons) to latches 19.

In response to a counter enable signal (EN2) the counter 23 begins counting, and the output signal of the counter 23 is provided to each latch 19.

Figure 2:
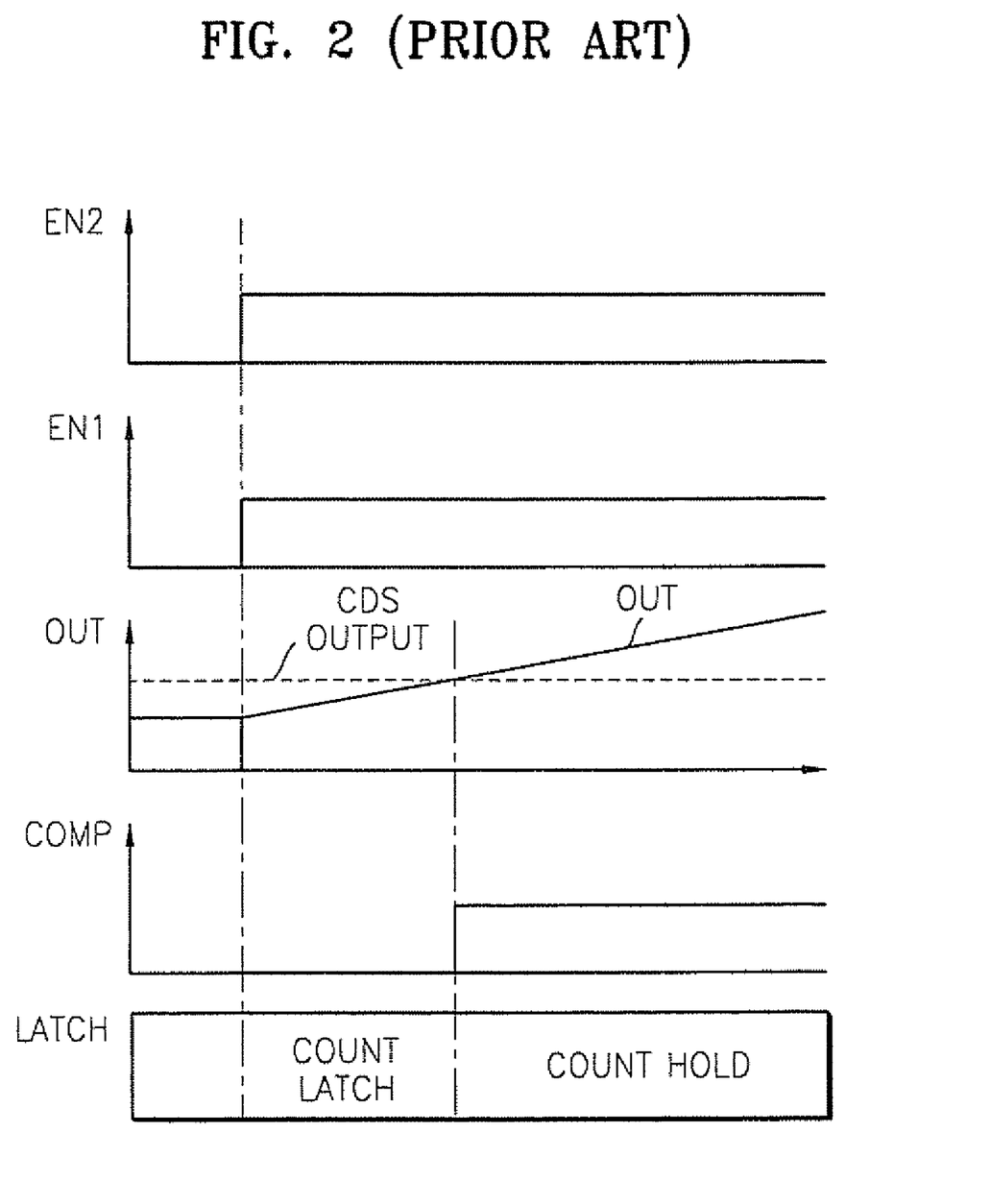
FIG. 2 is a timing diagram of operations of the converter of FIG. 1.

FIG. 2 is a timing diagram of the operations of the converter of FIG. 1. Referring to FIGS. 1 and 2, the counter 23 and the ramp signal generator 21 are activated at the same time in response to respective enable signals (EN1, EN2). Accordingly, the counter 23 begins counting and each latch 19 latches each counted value.

If the level of the ramp signal (OUT) is higher than the level of the output signal of a CDS circuit 15, the output signal (COMP) of the respective comparator 17 transitions from a logic "low" level to a logic "high" level. In response to the state transition of the output signal (COMP) of the comparator 17, the latch 19 latches the received count value. Accordingly an analog signal generated by each pixel 11 is converted to a digital signal.

If there is no incident light to a pixel 11, the respective latch 19 will ideally output a digital signal "0". However, even if there is no incident light on a pixel 11, the latch 19 may not output a digital signal "0" as a result of, for example, dark current resulting from leakage current in the pixel 11; an offset of CDS circuit 15; an offset of comparator 17; and/or an offset of ramp signal generator 21.

Accordingly, if offsets of the CDS circuit 15, the comparator 17, and/or the ramp signal generator 21 increase, the dynamic range of the ramp comparison analog-to-digital converter 10 may be reduced.

SUMMARY

According to embodiments of the present invention, an image sensor may include a photosensitive element that generates an electrical signal corresponding to light incident thereon, and a ramp signal generator that generates a ramp signal. Generation of the ramp signal is initiated in response to activation of a ramp enable signal. An offset adjusting circuit can generate a counter enable signal after generation of the ramp enable signal and after generation of the ramp signal. A counter initiates counting responsive to generation of the counter enable signal, and a latch latches a counter output responsive to a comparison of the ramp signal and the electrical signal corresponding to light incident on the photosensitive element. The offset adjusting circuit can thus delay activation of the counter enable signal until after initiating generation of the ramp signal.

The offset adjusting circuit can compare the ramp signal with a reference signal and activate the counter enable signal responsive to the comparison. The offset adjusting circuit can activate the counter enable signal when the ramp signal equals the reference signal, and the ramp signal and the reference signal may be different when generation of the ramp signal is initiated. The reference signal can be a DC voltage generated by a DC voltage source. Moreover, the reference signal can be an electrical signal generated by an optical black pixel, wherein the optical black pixel can be a second photosensitive element that is shielded from light.

In addition, the electrical signal corresponding to light incident on the photosensitive element can be subjected to correlated double sampling before comparing with the ramp signal. The offset adjusting circuit can activate the counter enable signal when the ramp signal equals the reference signal, and the ramp signal and the reference signal may be different when generation of the ramp signal is initiated. The offset adjusting circuit may compare the ramp signal with a reference signal and activate the counter enable signal responsive to the comparison wherein the reference signal is subjected to correlated double sampling before comparing with the ramp signal. The reference signal can be a DC voltage generated by a DC voltage source. Moreover, the reference signal can be an electrical signal generated by an optical black pixel, wherein the optical black pixel comprises a second photosensitive element that is shielded from light. The photosensitive element can be one of a plurality of photosensitive elements arranged in an array of rows and columns in the image sensor, and each photosensitive element may correspond to a pixel of an image being sensed.

According to additional embodiments of the present invention, methods of sensing an image may include generating an electrical signal corresponding to light incident on a photosensitive element, and initiating generation of a ramp signal in response to activation of a ramp enable signal. A counter enable signal can be generated after activation of the ramp enable signal and after initiating generation of the ramp signal, and counting can be initiated responsive to generation of the counter enable signal. A count value can be latched responsive to a comparison of the ramp signal and the electrical signal corresponding to light incident on the photosensitive element. Activation of the counter enable signal can thus be delayed until after initiating generation of the ramp signal.

Generating the counter enable signal can include comparing the ramp signal with a reference signal and activating the counter enable signal responsive to the comparison. Generating the counter enable signal can also include generating the counter enable signal when the ramp signal equals the reference signal. The ramp signal may not be equal to the reference signal when generation of the ramp signal is initiated, and the reference signal can be a DC voltage generated by a DC voltage source. The reference signal can be an electrical signal generated by an optical black pixel, wherein the optical black pixel includes a second photosensitive element that is shielded from light.

The electrical signal corresponding to light incident on the photosensitive element may be subjected to correlated double sampling before comparing with the ramp signal. Generating the counter enable signal may include activating the counter enable signal when the ramp signal equals the reference signal, and the ramp signal and the reference signal may be different when generation of the ramp signal is initiated. Generating the counter enable signal may include comparing the ramp signal with a reference signal and activating the counter enable signal responsive to the comparison wherein the reference signal is subjected to correlated double sampling before comparing with the ramp signal. The reference signal may be a DC voltage, and/or the reference signal may be an electrical signal generated by an optical black pixel, wherein the optical black pixel comprises a second photosensitive element that is shielded from light. Moreover, the photosensitive element may be one of a plurality of photosensitive elements arranged in an array of rows and columns, and each photosensitive element may correspond to a pixel of an image being sensed.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Terms used herein are to be given their ordinary meaning unless explicitly defined otherwise herein.

Figure 3:
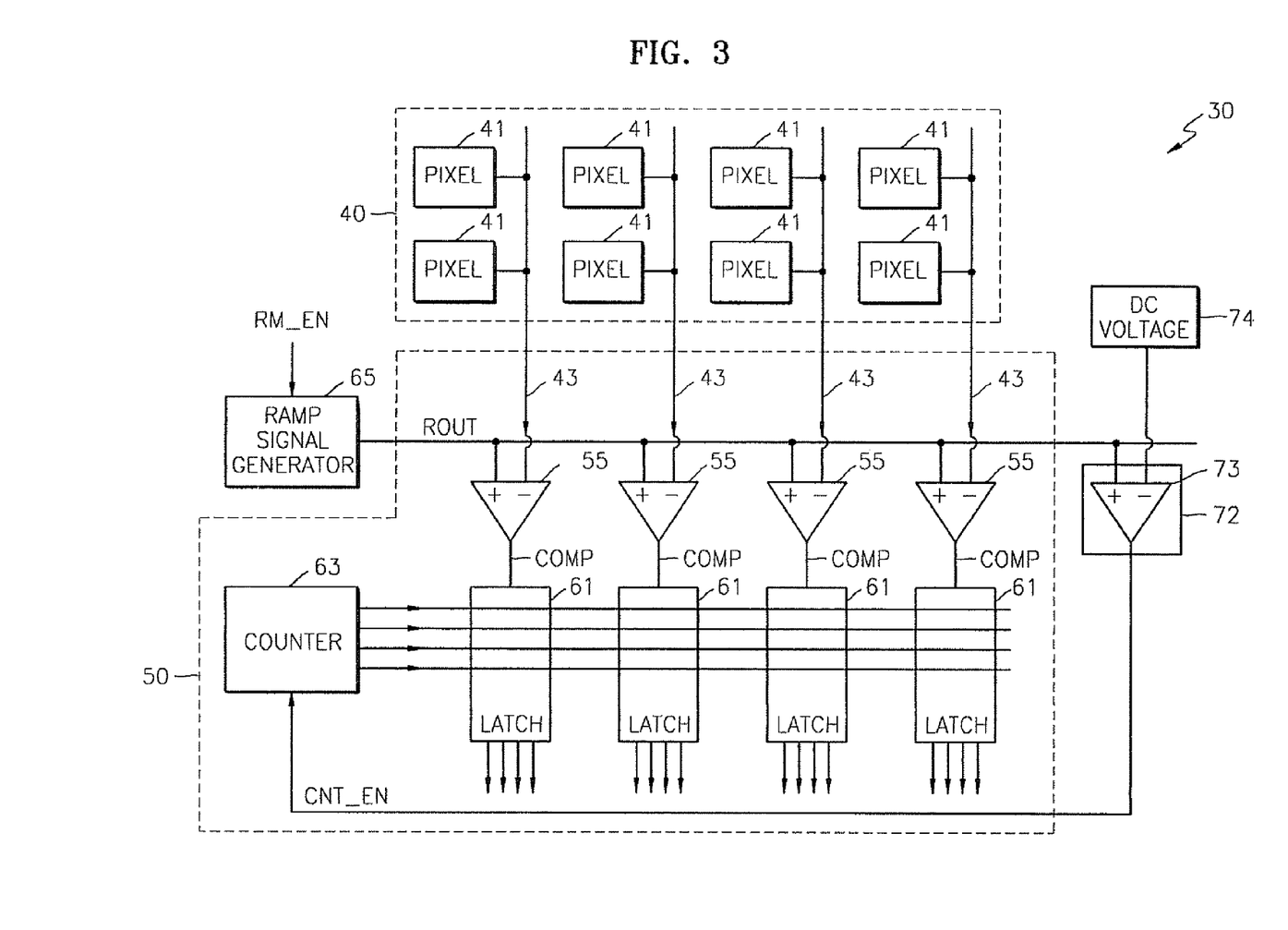
FIG. 3 is a diagram illustrating image sensors used in CMOS image sensors according to first embodiments of the present invention.

Referring to FIG. 3, an image sensor 30 includes a pixel array 40, a converting circuit 50, a ramp signal generator 65 for generating a ramp signal ROUT and an offset adjusting circuit 72. The image sensor 30 converts an analog signal generated by incident light in a CMOS image sensor to a digital signal.

The pixel array 40 includes a plurality of photosensitive elements 41 arranged in rows and columns. Each photosensitive element 41 includes a pixel element that may include any device that generates a photocharge or electrical signal in response to incident light. Stated in other words, each photosensitive element 41 may correspond to a pixel of an image being sensed.

Accordingly, each photosensitive element 41 may generate a photocharge and/or an electrical signal through a respective data line 43 associated with the photosensitive element 41. Each photosensitive element 41 can thus sense a portion of an image and generate an electrical signal corresponding to the image. As shown, a plurality of photosensitive elements 41 (such as a column) may be associated with a single data line 43, and switching may be provided so that only one photosensitive element is electrically connected with a data line at a time. For example, all photosensitive elements in a common row can be coupled to the respective data lines 43 at the same time.

The converting circuit 50 includes a plurality of comparators 55, a plurality of latches 61, and a counter 63. The converting circuit 50 receives the ramp signal (ROUT) and the output signal of each pixel 41; compares the received signals; and, according to the results of the comparisons, generates digital signals corresponding to the signals from the photosensitive elements 41. The ramp signal generator 65 generates the ramp signal (ROUT) which changes over time in response to a ramp enable signal (RM_EN).

Each of the comparators 55 receives the ramp signal (ROUT) and the output signal of a photosensitive element 41; and compares the received signals. According to a comparison result, each comparator is generates a comparison signal (COMP) having one of two states, a first state (for example, a logic "low" level), and a second state (for example, a logic "high" level).

The counter 63 begins counting up (or down) in response to a counter enable signal (CNT_EN) generated by the offset adjusting circuit 72. The output signal of the counter 63 is provided to each of the plurality of latches 61. Each of the latches 61 receives the output signal of the counter 63, and in response to the output signals (COMP) from respective comparators 55, latches the output signal of the counter 63.

The offset adjusting circuit 72 can be implemented using a reference comparator 73. The reference comparator 73 receives and compares the ramp signal (ROUT) and a reference signal, and generates a counter enable signal (CNT_EN) responsive to the comparison. The counter enable signal is provided to the counter 63. Accordingly, the converting circuit 50 converts an analog signal to a digital signal. Here, the reference voltage may be a DC voltage 74.

Figure 5:
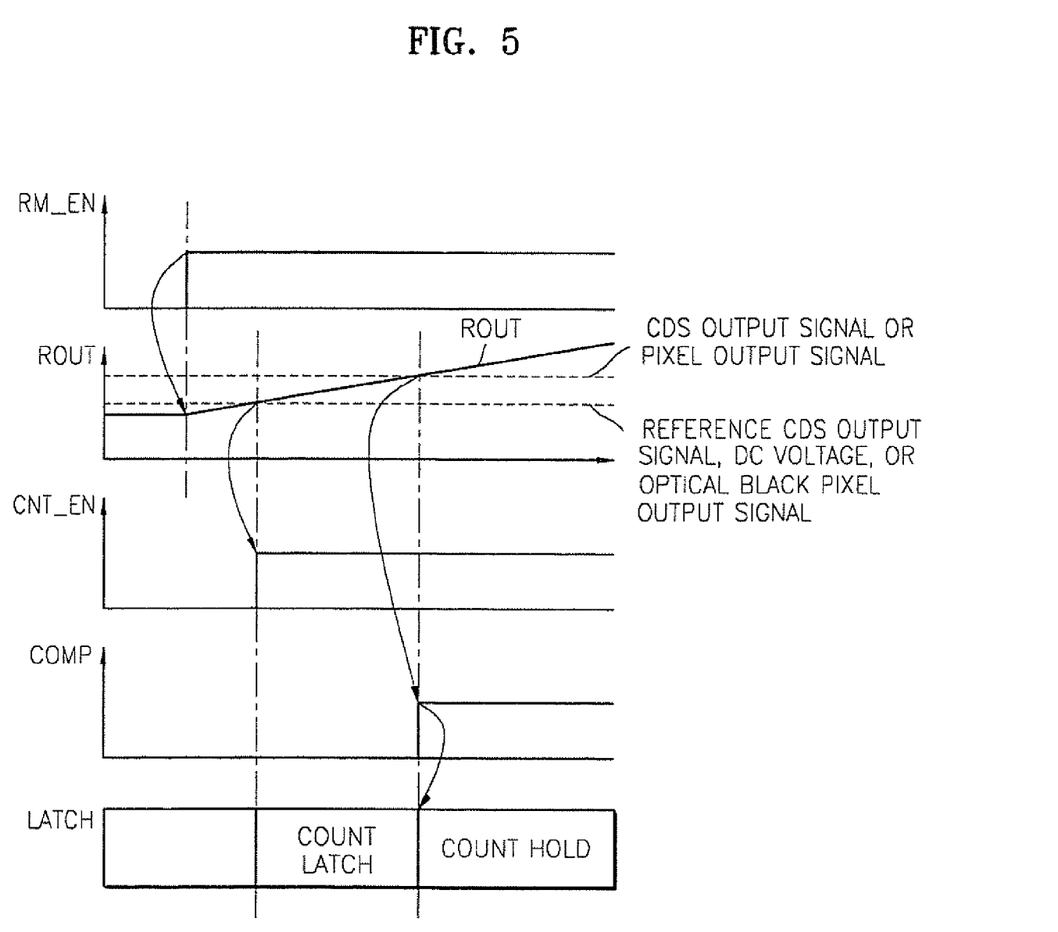
FIG. 5 is a timing diagram illustrating operations of image sensors according to embodiments of the present invention.

FIG. 5 is a timing diagram of operations of a signal converting circuit, such as image sensor 30, according to embodiments of the present invention. Referring to FIGS. 3 and 5, operations of the image sensor 30 according to the present invention will now be explained in greater detail.

The ramp signal generator 65 generates a ramp signal (ROUT) that is provided to the (+) input terminal of each comparator 55 in response to a ramp enable signal (RM_EN). The reference comparator 73 receives and compares a DC voltage 74 (input through its − input terminal) and the ramp signal (ROUT) (input through its + input terminal). If the level of the DC voltage 74 is higher than the level of the ramp signal (ROUT), the reference comparator 73 generates a counter enable signal (CNT_EN) that is inactivated (for example, a logic "low" level). Accordingly, the counter 63 maintains an inactivated state in response to the inactivated counter enable signal (CNT_EN). Stated in other words, the counter 63 does not count when the counter enable signal is inactivated.

If the level of the DC voltage is equal to or lower than the is level of the ramp signal (ROUT), the output signal (CNT_EN) of the reference comparator 73 transitions from a logic "low" level (inactivated) to a logic "high" level (activated), and therefore an activated counter enable signal (CNT_EN) is provided to the counter 63. Accordingly, the counter 63 digitally counts up (or down) in response to the activated counter enable signal (CNT_EN). Because the output signal of the counter 63 is provided to the latches 61, the latches 61 receive the output signal of the counter 63.

Stated in other words, the ramp signal is initially different than the reference signal so that the reference comparator 73 initially generates an inactivated counter enable signal. When the ramp signal equals the reference signal, the reference comparator 73 generates an activated counter enable signal. While the transition from inactivated to activated counter signal is discussed as occurring when the ramp signal equals the reference signal, it will be understood that the transition may occur when the ramp signal is equal to or past the reference signal according to operation of the reference comparator and/or propagation delays thereof.

Each comparator 55 receives an output signal from a corresponding photosensitive element 41 and the ramp signal (ROUT), and compares the received signals. If the level of the output signal from the corresponding photosensitive element 41 is higher than the level of the ramp signal (ROUT), the comparator 55 generates a logic "low" level. However, when the level of the ramp signal (ROUT) equals or exceeds the level of the output signal of the photosensitive element 41, the output signal from the comparator 55 transitions from a logic "low" level to a logic "high" level. Accordingly, the latch 61 latches the present output signal (count value) of the counter 63 in response to the comparison signal (COMP) transitioning to the logic "high" level.

Therefore, if the level of the ramp signal (ROUT) is equal to the level of the output signal of the photosensitive element 41, the latch 61 latches the output signal (count value) of the counter 63, thereby converting the analog output signal of the photosensitive element 41 to the digital output signal (count valve) of the counter 63. That is, the latch 61 receives the output signal of the counter 63, and if the level of the ramp signal (ROUT) is equal to the level of the output signal of the photosensitive element 41, latches the digital signal that is the output signal of the counter 63.

Figure 4:
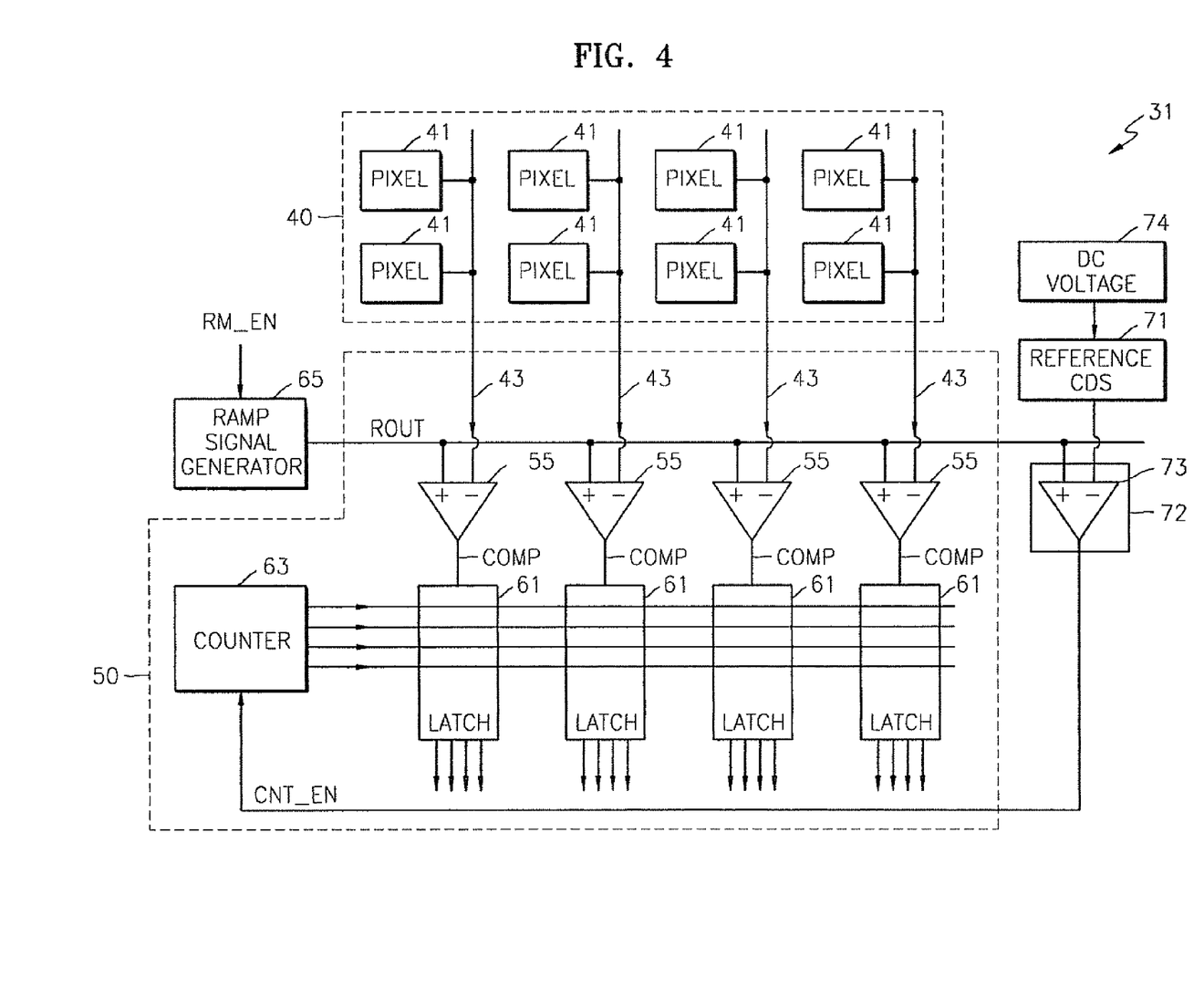
FIG. 4 is a diagram illustrating image sensors used in CMOS image sensors according to second embodiments of the present invention.

FIG. 4 is a schematic diagram of an image sensor 31 that is used in a CMOS image sensor according to second embodiments of the present invention. Referring to FIG. 4, the image sensor 31 includes a pixel array 40, a plurality of CDS circuits 51, a converting circuit 50, a ramp signal generator 65, a reference CDS circuit 71, and an offset adjusting circuit 72. The offset adjusting circuit 72 can be implemented using a reference comparator 73.

The structures and operations of the pixel array 40, the converting circuit 50, the ramp signal generator 65, and the offset adjusting circuit 72 of the image sensor 31 are the same as the structures and operations of the pixel array 40, the converting circuit 50, the ramp signal generator 65, and the offset adjusting circuit 72 of FIG. 3. The structure of the plurality of CDS circuits 51 and the reference CDS circuit 71 will now be explained.

Each of the plurality of CDS circuits 51 receives the output signal of a corresponding photosensitive element 41 through a data line 43; performs correlated double sampling; and generates a sampling signal that is the result of the correlated double sampling. The sampling signal is provided to the (−) input terminal of a comparator 55 corresponding to the CDS circuit 51. The reference CDS circuit 71 receives a reference voltage, performs correlated double sampling, and generates a sampling signal. The sampling signal of the reference CDS circuit 71 is provided to the (−) input terminal of the reference comparator 73. Here, it may be preferable that the reference voltage is a DC voltage 74. The counter 63 begins counting up (or down) in response to a counter enable signal (CNT_EN) generated by the reference comparator 73. The output signal of the counter 63 is provided to each of the plurality of latches 61.

As noted above, FIG. 5 is a timing diagram of the operation of a signal converting circuit such as image sensor 31 according to embodiments of the present invention. Referring to FIGS. 4 and 5, the operation of the image sensor 31 according to embodiments of the present invention will now be explained in greater detail.

The ramp signal generator 65 generates a ramp signal (ROUT) that is provided to each comparator 55 in response to a ramp enable signal (RM_EN). The reference comparator 73 receives and compares the output signal of the reference CDS circuit 71 and the ramp signal (ROUT). If the level of the output of the reference CDS circuit 71 is higher than the level of the ramp signal (ROUT), the reference comparator 73 generates an inactivated counter enable signal (CNT_EN) which is provided to the counter 63. Accordingly, the counter 63 maintains an inactivated state in response to the inactivated counter enable signal (CNT_EN). Stated in other words, the counter 63 does not count when the counter enable signal is inactivated.

If the level of the ramp signal (ROUT) is equal to the level of the output signal of the reference CDS circuit, the output signal (CNT_EN) of the reference comparator 73 transitions from a logic "low" level (inactivated) to a logic "high" level (activated), and therefore the activated counter enable signal (CNT_EN) is provided to the counter 63. Accordingly, the counter 63 digitally counts up (or down) in response to the activated counter enable signal (CNT_EN). Because the output signal of the counter 63 is provided to the latches 61, the latches 61 receive the output signal of the counter 63.

Each comparator 55 receives the output signal of a CDS circuit 51 and the ramp signal (ROUT), and compares the signals. If the level of the output signal of the corresponding CDS circuit 51 is higher than the level of the ramp signal (ROUT), the comparator 55 maintains a logic "low" level output. However, if the level of the ramp signal (ROUT) is equal to the level of the output signal of the corresponding CDS circuit 51, the output signal of the comparator 55 transitions from a logic "low" level to a logic "high" level. Accordingly, the latch 61 latches the current output signal of the corresponding counter 63 in response to the comparison signal (COMP) transitioning to a logic "high" level.

Therefore, if the level of the ramp signal (ROUT) is equal to the level of the output signal of the CDS circuit 511 the corresponding latch 61 latches the output signal (count value) of the counter 63, thereby converting the output signal of the CDS circuit 51 to the digital output signal (count value) of the counter 63.

Since the reference comparator 73 receives the output signal of the reference CDS circuit 71, if there is no change in the DC voltage 74 input to the reference CDS circuit 71, ideally, the reference comparator 73 can perform a comparison operation for an input signal "0". Accordingly, because the counter 63 can count from the input signal "0", the latch 61 can output the digital signal "0".

In this case, if the ramp signal (ROUT) begins from a level a little lower than the level of the output signal of the CDS circuit 51, this can guarantee that the output signal of the reference comparator 73 changes after a predetermined time. Because an offset occurring in the image sensor 31 can be automatically adjusted, loss in the dynamic range of the image sensor 31 can be reduced.

Figure 6:
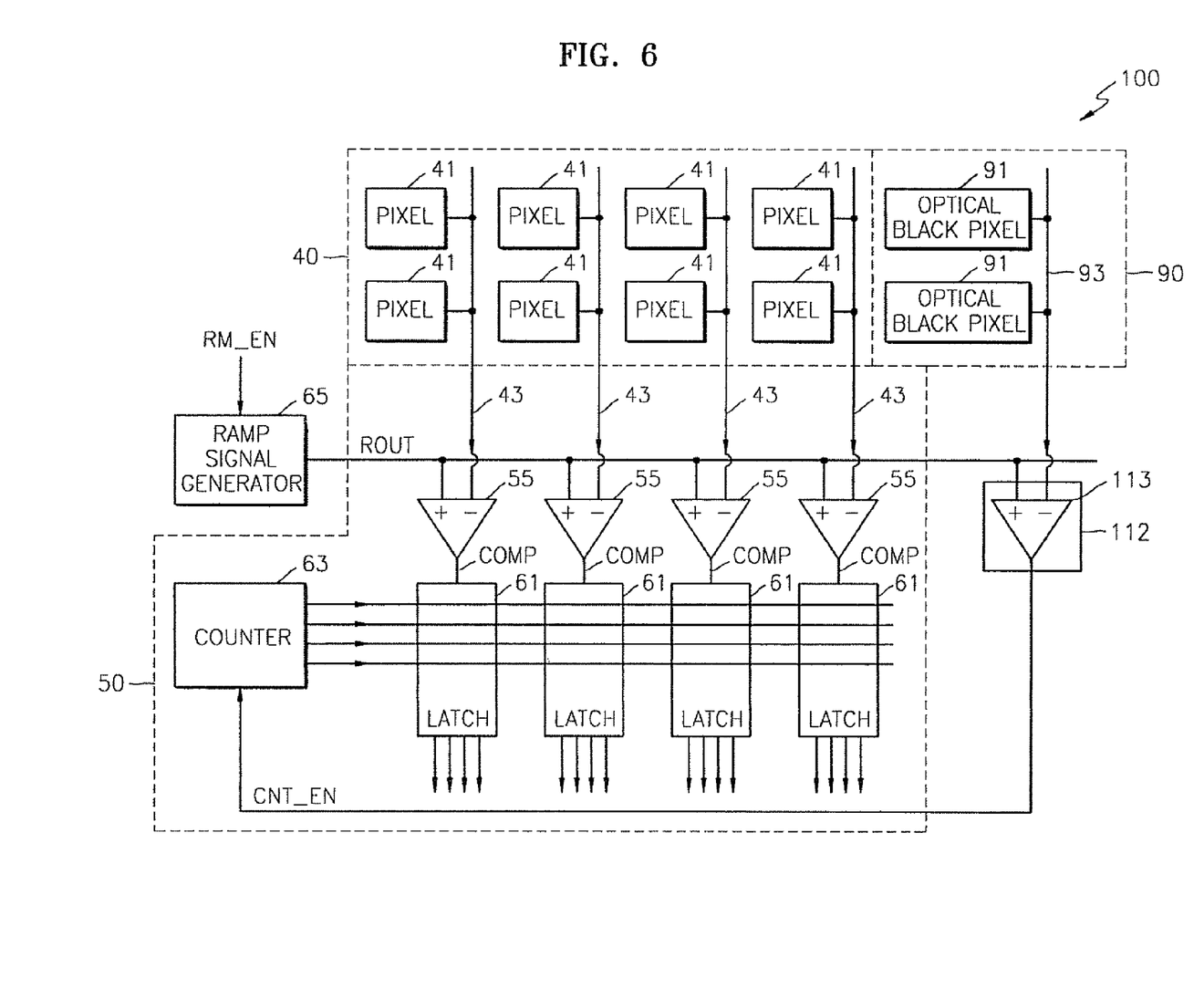
FIG. 6 is a diagram illustrating image sensors used in CMOS image sensors according to third embodiments of the present invention.

FIG. 6 is a diagram of an image sensor 100 used in CMOS image sensors according to third embodiments of the present invention. Referring to FIG. 6, the image sensor 100 comprises a pixel array 40, an optical black pixel array 90, a converting circuit 50, a ramp signal generator 65, and an offset adjusting circuit 112. The pixel array 40 comprises a plurality of photo sensitive elements 41 arranged in rows and columns of two dimensions with each photosensitive element 41 corresponding to a respective pixel of the pixel array 40. In response to incident light, each photosensitive element 41 generates a respective electrical signal which it provides to a connected data line 43.

The optical black pixel array 90 includes a plurality of optical black pixels 91. The optically black pixels 91 can be arranged in a one dimensional column. In response to incident light, each optical black pixel 91 generates a respective electrical signal which it outputs to a connected data line 93. Each optical black pixel may comprise a photosensitive element shielded from light.

The structure and function of the converting circuit 50 are the same as those of the converting circuit 50 of FIG. 3. That is, the converting circuit 50 receives the ramp signal (ROUT) and the output signals from photosensitive elements 41, compares the received signals, and according to the comparisons, generates digital signals corresponding to the output signals from the photosensitive elements 41. Each comparator 55 receives and compares the ramp signal (ROUT) and the output signal of a corresponding photosensitive element 41, and generates a comparison signal (COMP). The offset adjusting circuit 112 includes a reference comparator 113.

The reference comparator 113 receives the output signal from the optical black pixel(s) 91 through its (−) input terminal and the ramp signal (ROUT) through its (+) input terminal. The reference comparator 113 compares the received signals, and generates a counter enable signal (CNT_EN) through its output terminal. The counter enable signal is provided to the counter 63.

Referring to FIGS. 5 and 6, operations of the image sensor 100 according to embodiments of the present invention will now be explained in greater detail. The ramp signal generator 65 generates a ramp signal (ROUT) that is provided to each comparator 55 and the reference comparator 113 in response to a ramp enable signal (RM_EN). The reference comparator 113 receives and compares the ramp signal (ROUT) and the output signal of the optical black pixel(s) 91, and generates a counter enable signal (CNT_EN) responsive to the comparison. The counter enable signal is provided to the counter 63.

If the level of the output signal of the optical black pixel(s) 91 is higher than the level of the ramp signal (ROUT), the reference comparator 113 generates an inactivated counter enable signal (CNT_EN) that is provided to the counter 63. Accordingly, the counter 63 maintains an inactivated state in response to the inactivated counter enable signal (CNT_EN). Stated in other words, the counter 63 does not count in response to the inactivated counter enable signal.

When the level of the output signal of the optical black pixel 91 is equal to the level of the ramp signal (ROUT), the reference comparator 113 generates an activated counter enable signal (CNT_EN) that is provided to the counter 63. Accordingly, the counter 63 digitally counts up or down in response to the activated counter enable signal (CNT_EN). Because the output signal of the counter 63 is provided to the latches 61, the latches 61 receive the output signal of the counter 63.

Each comparator 55 receives the output signal of a respective photosensitive element 41 and the ramp signal (ROUT), and compares the signals. If the level of the output signal of the photosensitive element 41 is higher than the level of the ramp signal (ROUT), the comparator 55 generates a logic "low" level. However, when the level of the ramp signal (ROUT) is equal to the level of the output signal of the photosensitive elements 41, the output signal of the comparator 55 transitions from a logic "low" level to a logic "high" level. Accordingly, the latch 61 latches the output signal (count value) of the counter 63 in response to the comparison signal (COMP) transitioning to a logic "high" level.

Figure 7:
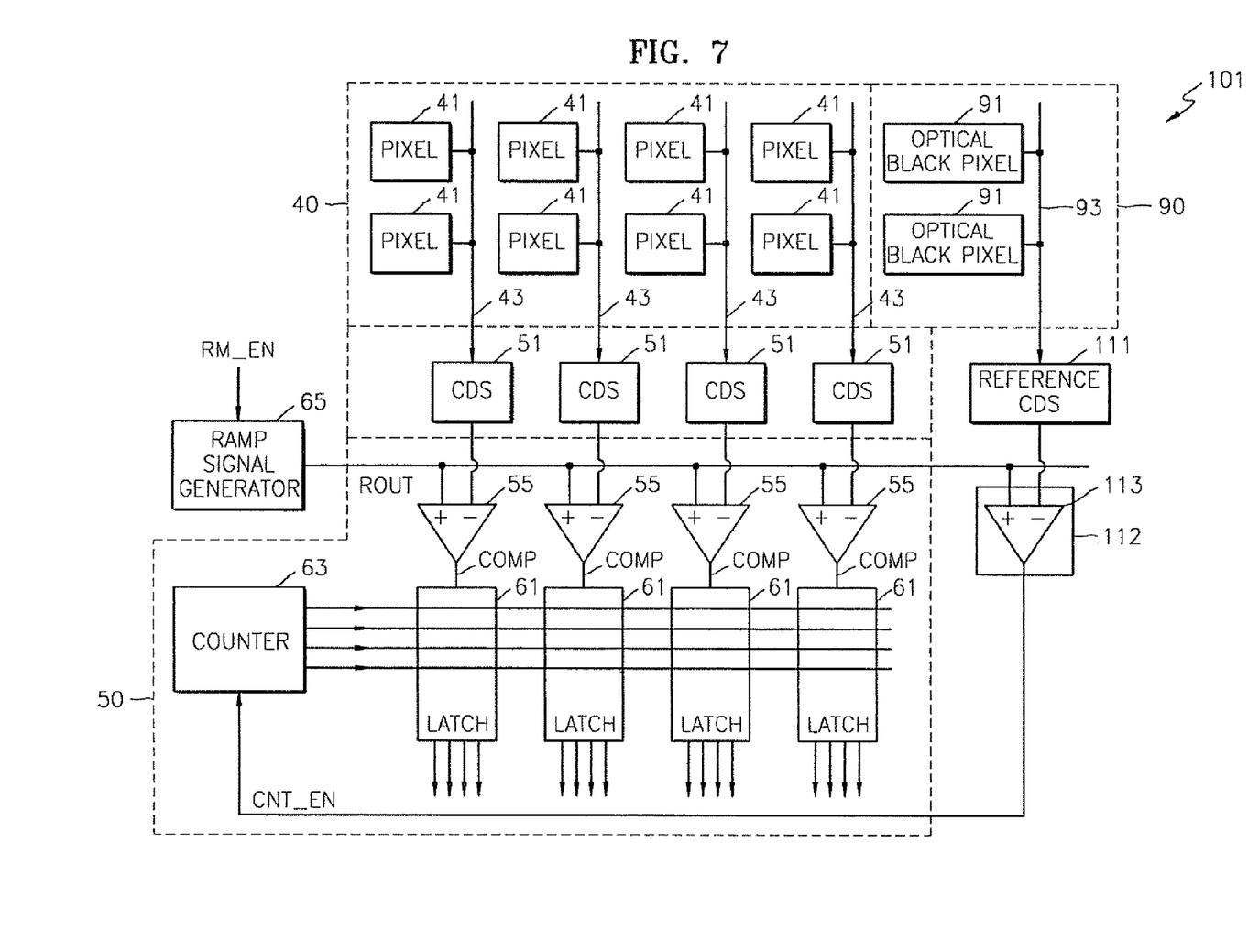
FIG. 7 is a diagram illustrating image sensors used in CMOS image sensors according to fourth embodiments of the present invention.

FIG. 7 is a diagram of an image sensor 101 which is used in CMOS image sensors according to fourth embodiments of the present invention. Referring to FIG. 7, the image sensor 101 includes a pixel array 40, an optical black pixel array 90, a plurality of CDS circuits 51, a converting circuit 50, a ramp signal generator 65, a reference CDS circuit 111, and an offset adjusting circuit 112. The offset adjusting circuit 112 can be implemented as a reference comparator 113.

Each of the plurality of CDS circuits 51 receives the output signal of a corresponding photosensitive element 41, performs correlated double sampling, and generates a sampling signal that is provided to a comparator 55. The reference CDS circuit 111 receives the output signal of an optical black pixel(s) 91, performs correlated double sampling, and outputs a sampling signal. The reference comparator 113 receives and compares the output signal from the reference CDS circuit 111 and the ramp signal (ROUT) from the ramp signal generator 65, and generates a counter enable signal (CNT_EN) that is provided to the counter 63.

Referring to FIGS. 5 and 7, operations of the image sensor 101 according to embodiments of the present invention will now be explained in greater detail. If the level of the output signal of the reference CODS circuit 111 is higher than the level of the ramp signal (ROUT), the reference comparator 113 generates an inactivated counter enable signal (CNT_EN) that is provided to the counter 63. If the level of the output signal of the reference CDS circuit 111 is equal to the level of the ramp signal (ROUT), the reference comparator 113 generates an activated counter enable signal (CNT_EN) that is provided to the counter 63. Accordingly, the counter 63 digitally counts up or down in response to the activated counter enable signal (CNT_EN). Because the output signal of the counter 63 is provided to the latches 61, the latches 61 receive the output signal of the counter 63.

Each comparator 55 receives and compares the output signal of a corresponding CDS circuit 51 and the ramp signal (ROUT). If the level of the output signal of the CDS circuit 51 is higher than the level of the ramp signal (ROUT), the comparator 55 generates a logic "low" level. However, if the level of the ramp signal (ROUT) is equal to the level of the output signal of the CDS circuit 51, the output signal of the comparator 55 transitions from a logic "low" level to a logic "high" level. Accordingly, the latch 61 latches the output signal (count value) of the counter 63 in response to the comparison signal (COMP) transitioning to a logic "high" level.

Figure 8:
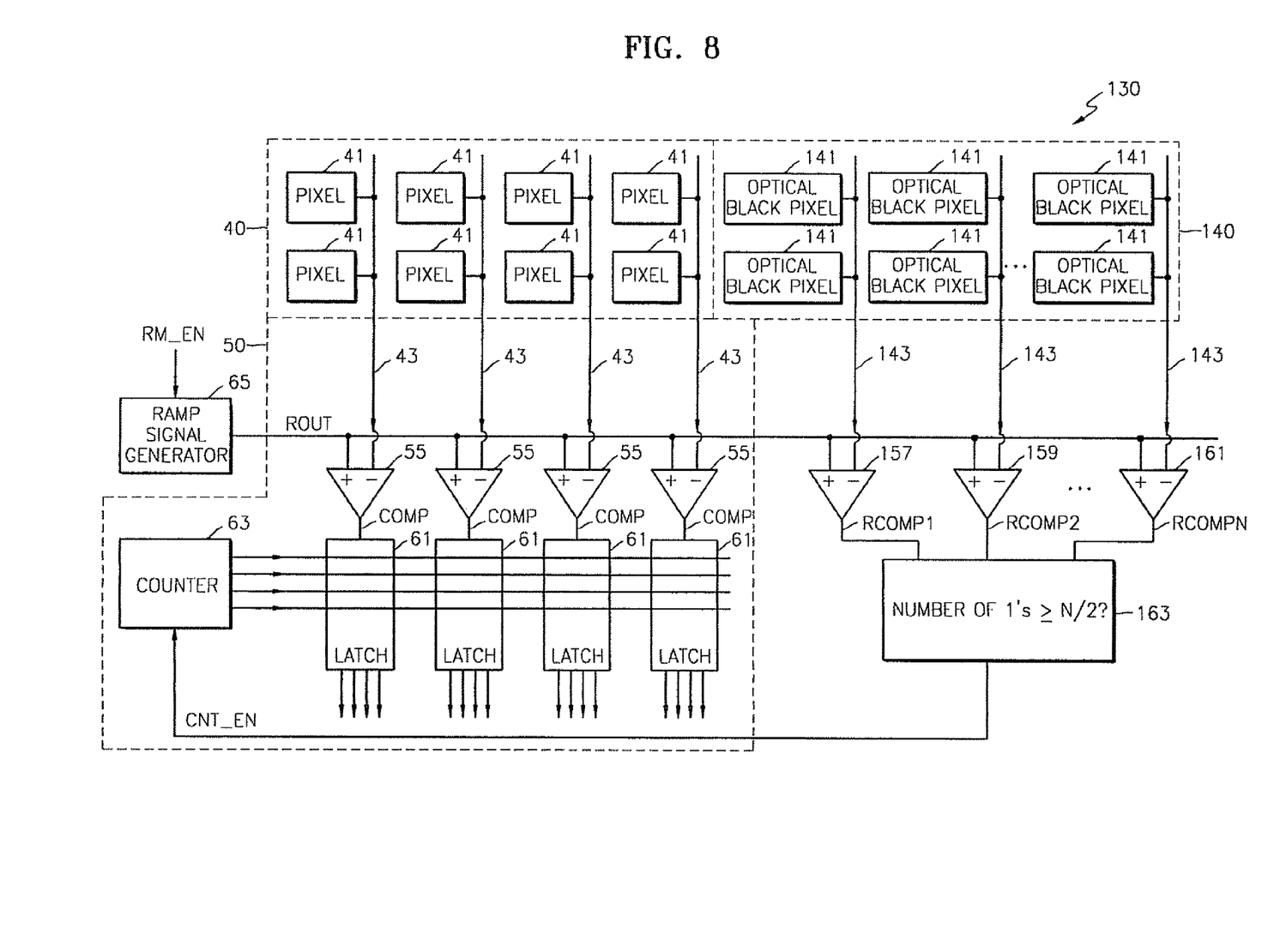
FIG. 8 is a diagram illustrating image sensors used in CMOS image sensors according to fifth embodiments of the present invention.

FIG. 8 is a diagram illustrating an image sensor 130 which is used in CMOS image sensors according to a fifth embodiments of the present invention. Referring to FIG. 8, the image sensor 130 includes a pixel array 40; an optical black pixel array 140; a converting circuit 50; a ramp signal generator 65; N reference comparators 157, 159 and 161; and a determination circuit 163.

The optical black pixel array 140 includes a plurality of optical black pixels 141 arranged in rows and columns of two dimensions. In response to incident light, each optical black pixel 141 generates an electrical signal and outputs the signal to a connected data line 143.

The structure and function of the converting circuit 50 are the same as those of the converting circuit 50 of FIG. 3. Each of the N is reference comparators 157, 159 and 161 receives the ramp signal (ROUT) from the ramp signal generator 65, and the output signal of a corresponding optical black pixel 141 through a connected data line 143; compares the received signals; and generates a comparison signal (RCOMP1 through RCOMPN) responsive to the comparison. The comparison signals are provided to the determination circuit 163.

The determination circuit 163 receives the output signals (RCOMP1 through RCOMPN); determines the number of output signals in a first state (for example, a logic "low" level) and the number of output signals in a second state (for example, a logic "high" level); and generates a counter enable signal (CNT_EN) corresponding to the determination result. The counter enable signal is provided to the counter 63. For example, if the number of output signals in a logic "high" state is equal to or greater than N/2, the determination circuit 163 generates an activated counter enable signal (CNT_EN) that is provided to the counter 63. However, if the number of output signals in a logic "low" state is greater than N/2, the determination circuit 163 generates an inactivated counter enable signal (CNT_EN) that is provided to the counter 63.

Accordingly, the image sensor 130 according to embodiments of the present invention comprises optical black pixels 141 arranged in a plurality of columns, and determines the states of output signals of the plurality of reference comparators 157 through 161, each corresponding to one of the columns. Because a counter enable signal (CNT_EN) is activated according to the determination result, a difference of an offset generated by an individual pixel can be adjusted. A more accurate offset can thus be provided by considering offsets of a plurality of optical black pixels. Operations of the image sensor 130 can be further understood with reference to embodiments described above.

Figure 9:
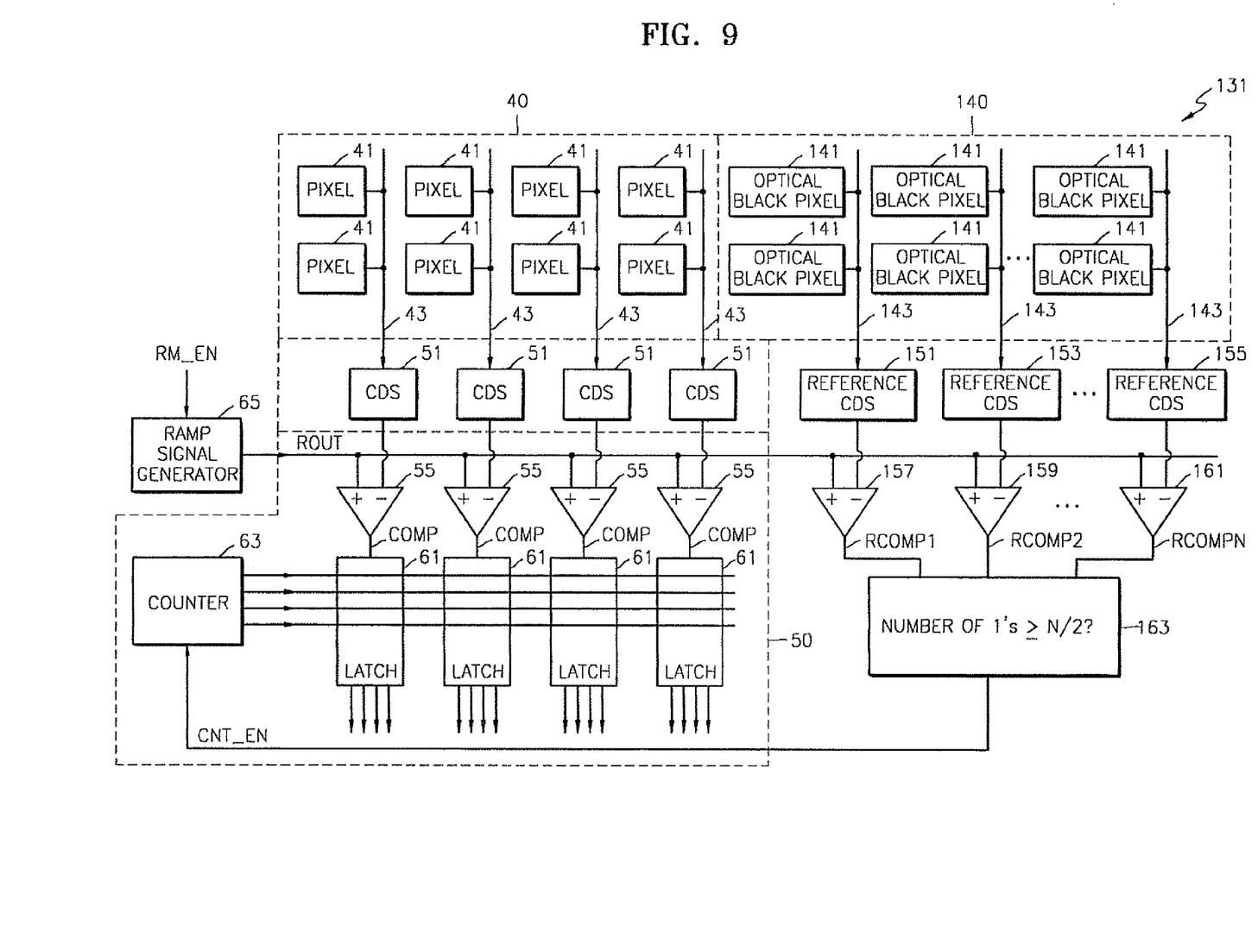
FIG. 9 is a diagram illustrating image sensors used in CMOS image sensors according to sixth embodiments of the present invention.

FIG. 9 is a schematic diagram of an image sensor 131 which is used in CMOS image sensors according to sixth embodiments of the present invention. Referring to FIG. 9, the image sensor 131 includes a pixel array 40, an optical black pixel array 140, a converting circuit 50, a plurality of CDS circuits 51, a ramp signal generator 65, a plurality of reference CDS circuits 151 through 155, N comparators 157 through 161, and a determination circuit 163. Each of the N reference CDS circuits 151 through 155 receives the output of a data line 143 corresponding to the reference CDS circuit, performs correlated double sampling, and generates a sampling signal. Each of the N reference comparators 157 through 161 receives the ramp signal (ROUT) from the ramp signal generator 65, and the output signal of a reference CDS circuit corresponding to the reference comparator, compares the received signal, and generates a comparison signal (RCOMP1 through RCOMPN). The comparison signals are provided to the determination circuit 163.

The determination circuit 163 receives the output signals (RCOMP1 through RCOMPN), determines the number of output signals in a first state and the number of output signals in a second state, and generates a counter enable signal (CNT_EN) responsive to the determination. The counter enable signal is provided to the counter 63. If the number of output signals in the second state is equal to or greater than N/2, for example, the determination circuit 163 generates an activated counter enable signal (CNT_EN) that is provided to the counter 63. If the number of output signals in the first state is greater than N/2, the determination circuit 163 generates an inactivated counter enable signal (CNT_EN) that is provided to the counter 63.

Accordingly, the image sensor 131 according to embodiments of the present invention includes optical black pixels 141 arranged in a plurality of columns, and determines the states of output signals of the plurality of reference comparators 157 through 161, each corresponding to one of the columns. Because a counter enable signal (CNT_EN) is activated according to the determination result, a difference of an offset generated by an individual pixel can be adjusted. Operations of the image sensor 131 can be further understood with reference to embodiments described above.

Figure 10:
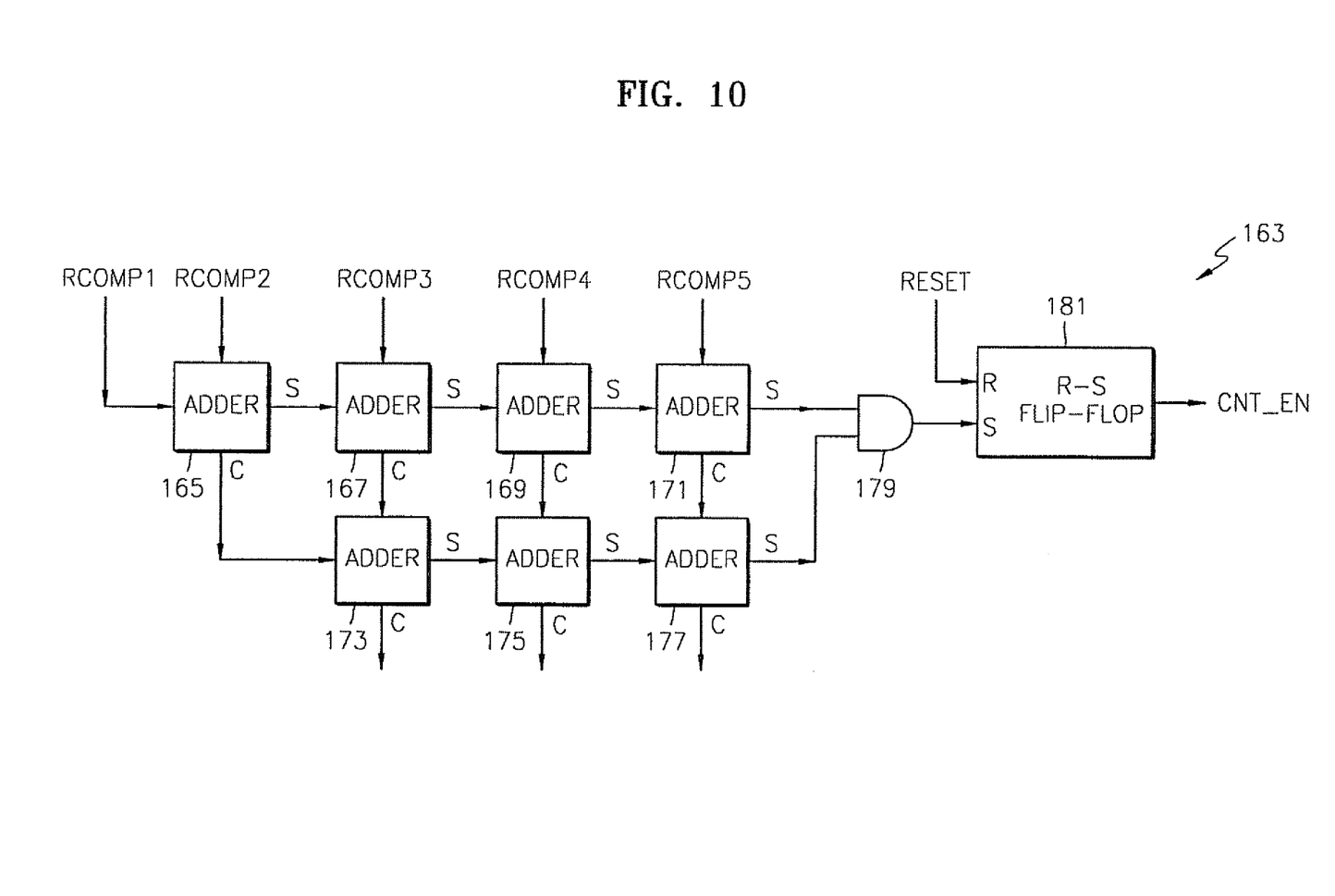
FIG. 10 is a diagram illustrating determination circuits suitable for use in some embodiments of circuits of FIGS. 8 and 9.

FIG. 10 is a circuit diagram of a determination circuit 163 that could be used in the image sensors of FIGS. 8 and 9. The determination circuit shown as an example in FIG. 10 receives comparison signals (RCOMP1 through RCOMP5) generated by five reference comparators. The determination circuit 163 comprises a plurality of adders 165 through 177, an AND gate 179, and an R-S flip-flop 181. It may be preferable that each of the plurality of adders 165 through 177 is a half adder.

The adder 165 receives comparison signals (RCOMP1 and RCOMP2), performs an add operation, and, as a result, outputs the sum (S) to the adder 167 and the carry (C) to the adder 173. The adder 167 receives the output signal (S) of the adder 165 and the comparison signal (RCOMP3), performs an add operation and, as a result, outputs the sum (S) to the adder 169 and the carry (C) to the adder 173. The adder 169 receives the output signal (S) of the adder 167 and the comparison signal (RCOMP4), performs an add operation, and, as a result, outputs the sum (S) to the adder 171 and the carry (C) to the adder 175. The adder 171 receives the output signal (S) of the adder 169 and the comparison signal (RCOMP5), performs an add operation, and, as a result, outputs the sum (S) to the AND gate 179 and the carry (C) to the adder 177.

The adder 173 receives the carry (C) from adder 165 and the carry (C) from adder 167, performs an add operation, and provides the sum (S) to the adder 175. The adder 175 receives the sum (S) from adder 173 and the carry (C) from the adder 169, performs an add operation, and provides the sum (S) to the adder 177. The adder 177 receives the sum (S) from the adder 175 and the carry (C) from the adder 171, performs an add operation, and provides the sum (S) to AND gate 179.

The AND gate receives the output signal (S) of the adder 171 and the output signal (S) of the adder 177, performs an AND operation, and provides the result to the set terminal (S) of the R-S flip-flop 181. The R-S flip-flop 181 receives the output signal of the AND gate 179 through the set terminal (S), receives a reset signal (RESET) through a reset terminal (R), and generates a counter enable signal (CNT_EN) at output terminal (Q).

For example, when the reset signal (RESET) is at a logic "low" level, all of the comparison signals RCOMP1 through RCOMP3 are at the second state (a logic "high" level), and both of the comparison signals RCOMP4 and RCOMP5 are at the first state (a logic "low" level), the determination circuit 163 generates an activated counter enable signal (CNT_EN). However, when the reset signal (RESET) is at a logic "low" level, both of the comparison signals RCOMP1 and RCOMP2 are at the second state, and all of the comparison signals RCOMP3 through RCOMP5 are at the first state, the determination circuit 163 generates an inactivated counter enable signal (CNT_EN).

Accordingly, the determination circuit 163 receives the output signals of N reference comparators, and if the number of output signals in the second state is greater than N/2, the determination circuit generates an activated counter enable signal (CNT_EN). However, if the number of output signals in the first state is less than N/2, the determination circuit 163 generates an inactivated counter enable signal (CNT_EN).

As discussed above, signal converting circuits (such as image sensors) and offset adjusting methods according to embodiments of the present invention can automatically adjust an offset occurring in a signal converting process. Signal converting circuits (such as image sensors) and offset adjusting methods according to embodiments of the present invention can automatically correct or adjust offsets of a CDS circuit, a comparator, and/or a ramp signal generator such that the signal converting circuit (such as an image sensor) can maintain a dynamic range according to its resolution. Embodiments of the present invention can thus provide signal converting circuits (such as image sensors) that can automatically adjust an offset which is generated during signal conversion to maintain a dynamic range of the signal converting circuit (such as image sensors) and methods therefore.

According to embodiments of the present invention, a signal converting circuit includes a photosensitive element, a converting circuit, and an offset adjusting circuit. The photosensitive element generates an electrical signal in response to incident light. The converting circuit receives and compares a ramp signal and the electrical signal, and according to the comparison result generates a digital signal corresponding to the electrical signal. The offset adjusting circuit compares a reference signal and the ramp signal, and generates an enable signal corresponding to the comparison result. The converting circuit is activated in response to the enable signal.

The reference signal may be a direct current (DC) signals. The converting circuit includes a comparator, a counter, and a latch. The comparator receives and compares the ramp signal and the electrical signal, and according to the comparison result generates a comparison signal having one of a first state and a second state. The counter digitally counts in response to the enable signal. The latch receives the output signal of the counter. In response to the state transition of the comparison signal, the latch latches the output signal of the counter, and generates a digital signal.

The converting circuit generates the digital signal corresponding to the electrical signal if the level of the ramp signal is equal to the level of the electrical signal. The converting circuit includes a counter that digitally counts in response to the enable signal and a latch that receives the output signal of the counter. If the level of the ramp signal is equal to the level of the electrical signal, the converting circuit outputs the output signal of the counter as the digital signal.

According to additional embodiments of the present invention, a signal converting circuit includes a photosensitive element, a first correlated double sampling circuit, a converting circuit, a second correlated double sampling circuit, and an offset adjusting circuit. The photosensitive element generates an electrical signal in response to incident light. The first correlated double sampling circuit receives the electrical signal, performs correlated double sampling, and outputs a first sampling signal. The converting circuit receives and compares a ramp signal and the first sampling signal, and according to the comparison result generates a digital signal corresponding to the electrical signal. The second correlated double sampling circuit receives a reference voltage, performs correlated double sampling, and generates a second sampling signal. The offset adjusting circuit receives and compares the ramp signal and the second sampling signal, and generates an enable signal corresponding to the comparison result. The converting circuit is activated in response to the enable signal.

According to still additional embodiments of the present invention, a signal converting circuit includes a pixel, an optical black pixel, a converting circuit, and an offset adjusting circuit. The pixel generates a first electrical signal in response to incident light. The optical black pixel generates a second electrical signal in response to the incident light. The converting circuit receives and compares a ramp signal and the first electrical signal, and according to the comparison result generates a digital signal corresponding to the first electrical signal. The offset adjusting circuit compares the second electrical signal with the ramp signal, and generates an enable signal corresponding to the comparison result. Here, the converting circuit is activated in response to the enable signal.

According to yet additional embodiments of the present invention, there is provided a signal converting circuit including a pixel, an optical black pixel, a first correlated double sampling circuit, a converting circuit, a second correlated double sampling circuit, and an offset adjusting circuit. The pixel generates an electrical signal in response to incident light. The first correlated double sampling circuit receives the electrical signal, performs correlated double sampling, and outputs a first sampling signal. The converting circuit receives and compares a ramp signal and the first sampling signal, and outputs a digital signal corresponding to the comparison result. The second correlated double sampling circuit receives the output signal of the optical black pixel, performs correlated double sampling, and generates a second sampling signal. The offset adjusting circuit receives and compares the ramp signal and the second sampling signal, and generates an enable signal corresponding to the comparison result. The converting circuit is activated in response to the enable signal.

The signal converting circuit includes a comparator, a counter, and a latch. The comparator receives and compares the ramp signal and the first sampling signal, and generates a comparison signal having one of a first state and a second state corresponding to the comparison result. The counter digitally counts in response to the enable signal. The latch receives the output signal of the counter and in response to the state transition of the comparison signal latches the digital signal generated by the counter.

The converting circuit generates a digital signal corresponding to the electrical signal if the level of the ramp signal is equal to the level of the first sampling signal. The converting circuit includes a counter which digitally counts in response to the enable signal and a latch which receives the output signal of the counter. If the level of the ramp signal is equal to the level of the first sampling signal, the converting circuit outputs the output signal of the counter as the digital signal.

According to more embodiments of the present invention, a signal converting circuit includes a photosensitive element, a plurality of optical black pixels, a converting circuit, a plurality of reference comparators, and a determination circuit. The photosensitive element generates an electrical signal in response to incident light. The plurality of optical black pixels are connected to respective data lines. The converting circuit receives and compares a ramp signal and the electrical signal and generates a digital signal corresponding to the comparison result. Each of the plurality of reference comparators receives the ramp signal and the output signal of the connected data line, compares the signals, and generates a comparison signal corresponding to the comparison result. The determination circuit receives the output signals of the plurality of reference comparators, determines a first state and a second state of the output signal of each of the plurality of reference comparators, and outputs an enable signal corresponding to the determination result. The converting circuit is activated in response to activation of the enable signal.

According to still more embodiments of the present invention, a signal converting circuit includes a photosensitive element, a plurality of optical black pixels, a first correlated double sampling circuit, a converting circuit, a plurality of second correlated double sampling circuits, a plurality of reference comparators, and a determination circuit. The photosensitive element generates an electrical signal in response to incident light. The plurality of optical black pixels are connected to respective data lines. The first correlated double sampling circuit receives the electrical signal, performs correlated double sampling, and generates a first sampling signal. The converting circuit receives and compares a ramp signal and the first sampling signal, and according to the comparison result generates a digital signal corresponding to the electrical signal.

Each of the plurality of second correlated double sampling circuits receives the output signal of a connected data line, performs correlated double sampling, and generates a second sampling signal. Each of the plurality of reference comparators receives the ramp signal and the output signal of the second correlated double sampling circuit corresponding to the reference comparator, compares the received signals, and generates a comparison signal corresponding to the comparison result. The determination circuit receives the output signals of the plurality of reference comparators, determines a first state and a second state of the output signal of each of the plurality of reference comparators, and outputs an enable signal corresponding to the determination result. The converting circuit is activated in response to activation of the enable signal.

According to yet more embodiments of the present invention, an offset adjusting method of a signal converting circuit can be provided. An electrical signal is generated in response to incident light. A ramp signal and the electrical signal are received and compared and a digital signal corresponding to the electrical signal is generated according to the comparison result. A reference signal and the ramp signal are compared and an enable signal corresponding to the comparison result is generated. The digital signal is generated in response to the enable signal.

According to additional embodiments of the present invention, an offset adjusting method of a signal converting circuit can be provided. Incident light or an image can be sensed and an electrical signal corresponding to the sensed image is generated. The electrical signal is received, correlated double sampling is performed, and a first sampling signal is generated. A reference voltage is received, correlated double sampling is performed, and a second sampling signal is output. A ramp signal and the first sampling signal are received and compared according to the comparison result, a digital signal corresponding to the electrical signal is generated. The ramp is signal and the second sampling signal are received and compared and an enable signal corresponding to the comparison result is generated. The digital signal is generated in response to the enable signal.

According to other embodiments of the present invention, an offset adjusting method of a signal converting circuit can be provided. A first electrical signal is generated in response to incident light. A second electrical signal is generated in response to the incident light. A ramp signal and the first electrical signal are received and compared and a digital signal corresponding to the first electrical signal is output according to the comparison result. The second electrical signal is compared with the ramp signal and an enable signal corresponding to the comparison result is generated. The digital signal is generated in response to activation of the enable signal.

According to still other embodiments of the present invention, an offset adjusting method of a signal converting circuit can be provided. A first electrical signal is generated in response to incident light. A second electrical signal is generated in response to the incident light. The first electrical signal is received, correlated double sampling is performed, and a first sampling signal is generated. A ramp signal and the first sampling signal are received and compared and a digital signal corresponding to the first electrical signal is generated according to the comparison result. The second electrical signal is received, correlated double sampling is performed, and a second sampling signal is generated. The ramp signal and the second sampling signal are received and compared and an enable signal corresponding to the comparison result is generated. The digital signal is output in response to activation of the enable signal.

It should be noted that many variations and modifications might be made to the embodiments described above without substantially departing from the principles of the present invention. All such variations and modifications are intended to be included herein within the scope of the present invention, as set forth in the following claims.

What is claimed is:

1. An offset adjusting method of a signal converting circuit comprising:
    generating a first electrical signal in response to incident light;
    generating a second electrical signal in response to the incident light;
    receiving and comparing a ramp signal and the first electrical signal and generating a first comparison result;
    outputting a digital signal corresponding to the first electrical signal according to the first comparison result; and
    comparing the second electrical signal with the ramp signal and generating a second comparison result; and
    outputting an enable signal corresponding to the second comparison result, wherein in outputting the digital signal, the digital signal is output in response to activation of the enable signal.

2. The offset adjusting method of claim 1, wherein outputting the digital signal comprises:
    receiving and comparing the ramp signal and the first electrical signal and outputting a comparison signal having a logic "high" state or a logic "low" state corresponding to the comparison result;
    digitally counting in response to the enable signal; and
    receiving the signal which is digitally counted and latching the signal in response to the state transition of the comparison signal.

3. The offset adjusting method of claim 1, wherein outputting the digital signal comprises:
    digitally counting in response to the enable signal; and
    receiving the output signal of the counter and latching the output signal if the level of the ramp signal is equal to the level of the first electrical signal.

4. An offset adjusting method of a signal converting circuit comprising:
    generating a first electrical signal in response to incident light;
    generating a second electrical signal in response to the incident light;
    receiving the first electrical signal, performing correlated double sampling, and outputting a first sampling signal;
    receiving and comparing a ramp signal and the first sampling signal and generating a first comparison result;
    outputting a digital signal corresponding to the first electrical signal according to the first comparison result;
    receiving the second electrical signal, performing correlated double sampling, and outputting a second sampling signal;
    receiving and comparing the ramp signal and the second sampling signal and generating a second comparison result; and
    outputting an enable signal corresponding to the second comparison result, wherein in outputting the digital signal, the digital signal is output in response to activation of the enable signal.

5. The offset adjusting method of claim 4, wherein outputting the digital signal comprises:
    receiving and comparing the ramp signal and the first electrical signal and outputting a comparison signal having a logic "high" state or a logic "low" state corresponding to the comparison result;
    digitally counting in response to the enable signal; and
    receiving the signal which is digitally counted and latching the signal in response to the state transition of the comparison signal.

* * * * *